United States Patent
Busick (10) Patent No.: US 9,969,632 B2
(45) Date of Patent: May 15, 2018

(54) DEVICE AND METHOD FOR SANITIZING SURFACES AND TREATING WATER USING OZONE

(71) Applicant: LVD Acquisition, LLC, Columbus, OH (US)

(72) Inventor: Louis Busick, Westerville, OH (US)

(73) Assignee: LVD ACQUISITION, LLC, Columbus, OH (US)

( * ) Notice: Subject to any disclaimer, the term of this patent is extended or adjusted under 35 U.S.C. 154(b) by 990 days.

(21) Appl. No.: 14/297,706

(22) Filed: Jun. 6, 2014

(65) Prior Publication Data

US 2014/0360948 A1 Dec. 11, 2014

Related U.S. Application Data

(60) Provisional application No. 61/832,193, filed on Jun. 7, 2013, provisional application No. 61/930,659, filed on Jan. 23, 2014.

(51) Int. Cl.
*C02F 1/78* (2006.01)

(52) U.S. Cl.
CPC .......... *C02F 1/78* (2013.01); *C02F 2201/005* (2013.01); *C02F 2201/78* (2013.01);
(Continued)

(58) Field of Classification Search
CPC .. C02F 1/78; C02F 2201/005; C02F 2201/78; C02F 2209/003; C02F 2209/005; C02F 2301/046; C02F 1/00878; B67D 3/009; B67D 3/0077; B67D 3/0038; B67D 3/0083; B67D 3/0074; B67D 3/0032;
(Continued)

(56) References Cited

U.S. PATENT DOCUMENTS

| 4,619,763 A | 10/1986 | O'Brien |
| 4,842,723 A | 6/1989 | Parks et al. |

(Continued)

FOREIGN PATENT DOCUMENTS

| JP | H01-275402 A | 11/1989 |
| JP | H07-008976 A | 1/1995 |

(Continued)

OTHER PUBLICATIONS

Written Opinion of the ISA in PCT/US2014/041219 (dated Sep. 9, 2014).*
The Tank Depot, www.tank-depot.com, website.

*Primary Examiner* — Lucas Stelling
(74) *Attorney, Agent, or Firm* — Standley Law Group LLP (57) ABSTRACT

A system for and method of sanitizing water and waterway surfaces using ozone gas is disclosed wherein water is circulated from a water reservoir in a water ozonation loop means. Ozone is generated by an ozone generator and dispensed into the circulating water by an ozone feed means. In some embodiments the ozone is generated from gas in the water reservoir and dispensed into the water ozonation loop means at a venturi tube. A controller is provided for activating an ozonation cycle. In some embodiments, the ozonation cycle includes the actuation of a circulating water pump for a cycle interval, and the actuation of an ozone generator during an ozone generation interval, which is less than the cycle interval.

10 Claims, 4 Drawing Sheets

(52) U.S. Cl.
CPC .. *C02F 2209/003* (2013.01); *C02F 2209/005* (2013.01); *C02F 2301/046* (2013.01)

(58) Field of Classification Search
CPC ........... B67D 2210/00007; B67D 2210/00013; B67D 2210/00023; B67D 2210/0001
See application file for complete search history.

(56) References Cited

U.S. PATENT DOCUMENTS

| | | | |
|---|---|---|---|
| 5,207,993 A * | 5/1993 | Burris | C02F 1/78 210/138 |
| 5,368,815 A | 11/1994 | Kasting, Jr. et al. | |
| 5,824,243 A | 10/1998 | Contreras | |
| 6,076,808 A | 6/2000 | Porter | |
| 6,085,540 A | 7/2000 | Davis | |
| 6,200,473 B1 | 3/2001 | Fahey | |
| 6,289,690 B1 | 9/2001 | Davis | |
| 6,532,760 B2 | 3/2003 | Davis | |
| 6,561,382 B2 | 5/2003 | Shelton | |
| 7,114,637 B2 | 10/2006 | Davis | |
| 7,175,054 B2 | 2/2007 | Davis et al. | |
| 7,258,803 B2 | 8/2007 | Davis | |
| 7,422,684 B1 | 9/2008 | Davis et al. | |
| 7,640,766 B2 | 1/2010 | Shelton | |
| 7,655,150 B2 | 2/2010 | Davis | |
| 7,748,233 B2 | 7/2010 | Davis et al. | |
| 8,007,666 B1 | 8/2011 | Davis et al. | |
| 8,056,358 B1 | 11/2011 | Shelton | |
| 2003/0000896 A1 | 1/2003 | Chowdhury | |
| 2003/0156978 A1 | 8/2003 | Gillette et al. | |
| 2006/0021634 A1* | 2/2006 | Liu | C02F 1/78 134/1.3 |
| 2008/0264877 A1 | 10/2008 | Davis | |
| 2010/0147690 A1* | 6/2010 | Audunson | C02F 1/685 204/557 |
| 2010/0288710 A1 | 11/2010 | Davis | |
| 2011/0006085 A1 | 1/2011 | Davis et al. | |
| 2013/0341285 A1* | 12/2013 | Marion | C02F 1/008 210/743 |

FOREIGN PATENT DOCUMENTS

| | | |
|---|---|---|
| JP | 2001-000986 A | 1/2001 |
| JP | 2005-021798 A | 1/2005 |
| JP | 2007-275893 A | 10/2007 |
| JP | 2009-028683 A | 2/2009 |
| JP | 2009-039614 A | 2/2009 |
| JP | 2012-179538 A | 9/2012 |
| JP | 2013-010068 A | 1/2013 |
| JP | 2013-094696 A | 5/2013 |
| WO | 03033402 A2 | 4/2003 |
| WO | 2009036512 A1 | 3/2009 |

* cited by examiner

DEVICE AND METHOD FOR SANITIZING SURFACES AND TREATING WATER USING OZONE

CROSS-REFERENCE TO RELATED APPLICATIONS

This application claims priority to U.S. Provisional Application No. 61/832,193 filed 7 Jun. 2013, and U.S. Provisional Application No. 61/930,659 filed 23 Jan. 2014, the content of each of which is hereby incorporated by reference as if fully recited herein.

TECHNICAL FIELD

Exemplary embodiments relate to devices and methods for sanitizing water and internal waterways in a water cooler by exposing the water within the cooler to ozone. A preferred exemplary embodiment utilizes a venturi to pull air through an ozone generator and to impart the ozone into moving water before the water is dispensed into a water reservoir within the cooler.

BACKGROUND AND SUMMARY OF THE INVENTION

Ozone is a naturally occurring molecule consisting of 3 oxygen atoms: $O_3$. Ozone readily gives up one atom of oxygen which provides a powerful oxidizing agent which is toxic to most waterborne organisms such as bacteria, mold and yeast spores, viruses and harmful protozoa that form cysts. There are numerous advantages of using ozone to purify water—particularly potable water. Ozone oxidizes and breaks down many organic chemicals including many that cause odor and taste problems in drinking water. Ozone purification produces no taste or odor in the water. Because ozone is made of oxygen and reverts to pure oxygen, it vanishes without a trace once it has been used. The U.S. Food and Drug administration has accepted ozone as being safe; and it is applied as an anti-microbial agent for the treatment, storage, and processing of foods.

Known water coolers which incorporate ozone for water purification utilize systems whereby ozone is drawn from an ozone generator through an oxidation line and then released via a bubbler, or diffuser, which is located within the water reservoir of the cooler. Similar systems mechanically introduce ozone into the water reservoir via, for example, the outlet of an impeller pump. The air introduced into the ozone generators in the prior art systems is drawn from intakes to the external environment. For example, see U.S. Pat. Nos. 6,085,540, 6,289,690, 6,532,760, 6,561,382, 7,114,637, 7,175,054, 7,258,803, 7,422,684, 7,640,766, 7,655,150, 7,748,233, 8,007,666, and 8,056,358 and United States Patent Application Publication Nos. 2008/0264877, 2010/0288710, and 2011/0006085 the disclosures of which are hereby incorporated by reference.

An object of the invention is to provide a water sanitizing apparatus that includes a water source and a water reservoir having a total volume, a volume of water received from the water source at a water inlet connection coupling the water reservoir to the water source, an upper reservoir chamber having a volume defined by the difference between the total volume of the water reservoir and the volume of water and wherein the volume contains air, and a water outlet connection coupling the water reservoir to a water outlet. A water ozonation loop means is included for circulating all or part of the volume of water from the water outlet to the upper reservoir chamber, and an ozone generation means is provided for converting air into ozone. The apparatus include an ozone feed means for dispensing the ozone into the volume of water circulated within the water ozonation loop means.

A preferred exemplary embodiment of a system of the present invention sanitizes internal waterway surfaces and treats the water within a water cooler through utilization of a circulating water pump which circulates water from a water reservoir and causes it to travel through a water feed line and through a Venturi tube, or venturi, that is located along the water feed line at a point preceding re-entry of the water into the water reservoir. When the water passes through the venturi, a suction force is created that causes air to be pulled through an ozone generator (thereby converting oxygen in the air to ozone), into an ozone feed line, and then into the water feed line where it merges with or is dispensed into the circulating water. Subsequently, the ozonated water is returned to the reservoir. Water may be pulled from a T-valve anterior to a faucet/dispenser connection or other outlet to ensure that the ozonated water contacts the maximum amount of surfaces within the water ways. In one exemplary embodiment, the water reservoir is substantially sealed during a cleaning cycle by drawing air contained in the water reservoir into the ozone feed line inlet via a tee fitting connected to the water reservoir air vent. Water may be pumped into the reservoir through the lid of a bottled water source located at floor level (called a bottom load cooler). However, the system may also be utilized with top-loaded and plumbed water cooler systems. In a preferred exemplary embodiment, water is circulated by the circulating water pump from the reservoir into the water feed line, and through the venturi where it is then introduced to ozone and subsequently returned to the water reservoir.

In some embodiments, a water ozonation loop is provided and includes a circulating water line capable of receiving a flow of water and having a proximal end coupled to the water outlet, and a distal end coupled to the upper reservoir chamber. The water ozonation loop may further include a circulating water pump and a venturi tube, where the circulating water pump and the venturi tube are each disposed between the proximal end and the distal end of the circulating water line and are each connected to the circulating water line such that the flow of water through the circulating water line passes through each of the circulating water pump and the venturi tube.

In some embodiments, an ozone feed loop is provided and includes an ozone feed line capable of receiving a flow of ozone and having a proximal end in receiving connection with the upper reservoir chamber and a distal end in dispensing connection with the venturi tube. The ozone feed loop may further include an ozone generator disposed between the proximal end and distal end of the ozone feed line and connected to the ozone feed line, wherein concurrent operation of the circulating water pump and the ozone generator circulates a flow of water from the water reservoir through the water ozonation loop, thereby drawing a flow of ozone from the ozone generator into the water ozonation loop.

In some embodiments, a water sanitizing apparatus is provided with a controller adapted for actuating the circulating water pump and the ozone generator to implement an ozonation cycle for a cycle interval. A preferred exemplary embodiment of a system of the present invention sanitizes surfaces and treats the water within a water cooler in a manner in which, for a given purification, cleansing or ozonation cycle, the ozone generator is activated for a fraction of the cycle, being deactivated after a first selectable time. The circulating water pump may be run continuously during the cycle, which concludes after a second selectable time. In some embodiments, the ozone generation interval is less than or equal to 10% of the cycle interval.

In some embodiments, the proximal end of the circulating water line is coupled to the water outlet connection. Some embodiments may also be provided with a check valve positioned on the ozone feed loop to prevent water flow into the ozone generator. Further embodiments are provided with an actuatable air vent connected to the water reservoir, and wherein the proximal end of the ozone feed line is in receiving connection with the upper reservoir chamber via the actuatable air vent.

An object of the invention is to provide a method for sanitizing a water dispensing system. Exemplary embodiments of the method include the steps of providing a water ozonation loop, providing an ozone feed loop, and programming a controller. The water ozonation loop provided includes a circulating water line having a proximal inlet end connected to a water outlet of a water reservoir and distal outlet end connected to a water inlet of the water reservoir, a circulating water pump, and a venturi tube between the circulating water pump and the proximal outlet end, wherein the circulating water pump and the venturi tube are each disposed between the proximal end and the distal end of the circulating water line and are each connected to the circulating water line such that a flow of water through the circulating water line passes through each of the circulating water pump and the venturi tube. The ozone feed loop provided includes an ozone feed line having a proximal gas inlet end connected to a top side of the water reservoir and a distal end connected to the venturi tube, and an ozone generator. The method includes the step of programming the controlled to implement an ozonation cycle being activatable by the controller, whereby the controller activates the circulating water pump and the ozone generator during the ozonation cycle to circulate a flow of water from the water reservoir through the water ozonation loop thereby drawing a flow of ozone from the ozone generator into the water ozonation loop.

In some embodiments, the controller is programmed to activate the ozonation cycle automatically at selectable periodic intervals. Some embodiments of the controller include a timer that initiates at the start of the ozonation cycle, and the method includes the step of terminating the ozonation cycle after a first selectable time interval. Further embodiments include the step of programming the controller to activate both the circulating water pump and the ozone generator when the ozonation cycle is activated, to deactivate the ozone generator after a first selectable time, and to deactivate the circulating water pump after a second selectable time, wherein the second selectable time coincides with the end of the ozonation cycle.

Another object of the invention is to provide a water sanitizing apparatus wherein the water reservoir includes an air vent, a water outlet connection coupling the water reservoir to a water outlet, and an overflow fitting. Some embodiments include an overflow line connecting the overflow fitting to the water source.

An additional object of the invention is to provide a water sanitizing apparatus for multiple configurations, wherein the apparatus is provided with an integral valve adapted for switching between a first state and a second state. In some embodiments the integral valve includes a first inlet connecting the integral valve with the water outlet wherein the first inlet is closed in the first state and open in the second state, a second inlet connecting the integral valve with the water source wherein the second inlet is open in the first state and closed in the second state, and an outlet open in both the first and second states. Some embodiments further include a water reservoir fitted with an overflow fitting, and an overflow line connecting the overflow fitting to the water source. In some embodiments, the controller is adapted for switching the integral valve to the second state and actuating the circulating water pump and the ozone generator to implement an ozonation cycle for a cycle interval.

It is an object of this invention to provide a device, system and method for sanitizing surfaces and treating water using ozone of the type generally described herein, being adapted for the purposes set forth herein, and overcoming disadvantages found in the prior art. These and other advantages are provided by the invention described and shown in more detail below.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein identical characters refer to identical parts and in which:

FIGS. 2A-C are perspective views of common configurations for water coolers where

DETAILED DESCRIPTION OF EXEMPLARY EMBODIMENT(S)

Figure 1:
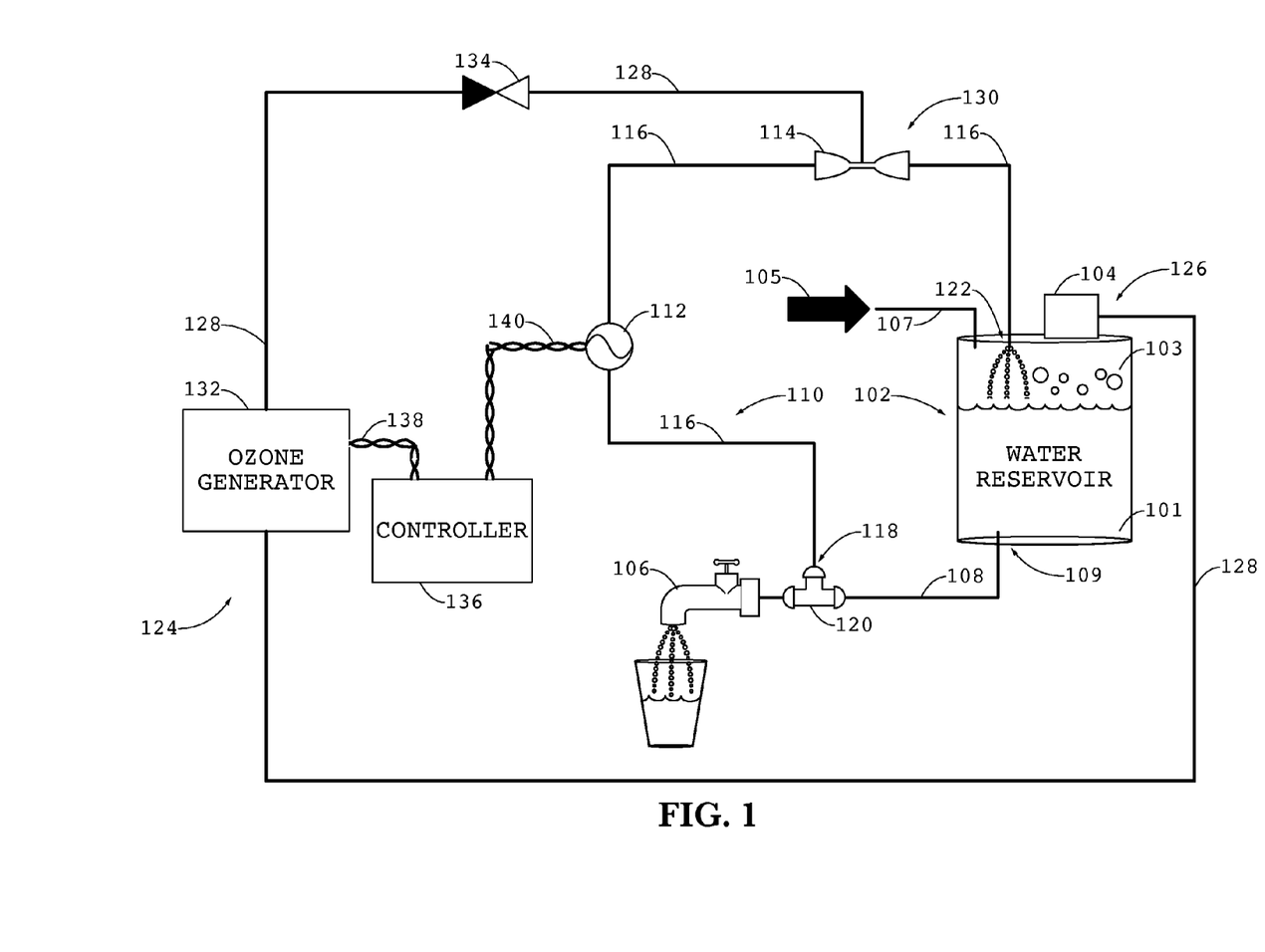
FIG. 1 is a schematic diagram view of the elements of a first exemplary embodiment of the invention.

An exemplary embodiment of the invention is depicted in FIG. 1 wherein volume of water 101 is contained within the water reservoir 102 of a water cooler. When the volume of water 101 is less than the total volume of the reservoir 102, an upper reservoir chamber 103 is defined, and typically contains gas, such as air. The water reservoir may be from any of the water cooler configurations generally discussed in connection with FIGS. 2A-C, or other similar water dispensers that utilize a water reservoir. The water reservoir 102 receives water from a water source 105 and a water inlet connection 107 and could, for instance, be a water bottle or container, the outlet of a pump, from direct connection to plumbing, or any known manner of supplying water to a water dispensing system. An air vent 104 is coupled to the top of the water reservoir 102 and allows air to enter or escape the reservoir 102 as water is dispensed from and refills the reservoir 102.

A water tap, dispenser or spigot 106 draws water from the reservoir 102 directly at a water outlet connection 109, or indirectly through a water outlet 108 connected to the water outlet connection 109, as shown in FIG. 1. Water taps are typically hot and cold outlets on water coolers such as those shown in FIGS. 2A-C, but need not be limited in function as the present invention is useful for cleaning and purifying water systems regardless of their function. A water reservoir may have multiple water outlets or water outlet connections for varying purposes and, as will be further described in more detail below, the proximal end of the water ozonation loop may be coupled to any existing water outlet or water outlet connection, or it may connect to a corresponding dedicated water outlet. A water outlet as used herein generally refers to any pathway through which water exits the water reservoir.

A water ozonation loop 110 circulates water from the reservoir 102 via a circulating water pump 112 through a venturi tube 114 and deposits the water back into the reservoir 102. The water ozonation loop 110 connects the water reservoir 102, circulating pump 112, and venturi tube 114 together in a loop using a circulating water line 116. The proximal end 118 of the water line 116 receives water from the reservoir 102 and is shown in FIG. 1 connected to the water outlet 108 at a tee fitting 120. It is preferred that the proximal end 118 of the water line 116 be connected as close to the water taps 106 in series as practicable. Circulating ozonated water will cleanse and sanitize the maximum amount of a water cooler system's internal waterway area if the water from the reservoir 102 travels as near to the water outlet 106 as possible. However, while this is considered a preferred exemplary embodiment, it is sufficient to practice the claimed invention by placing the proximal end 118 of the water line 116 in any appropriate receiving connectivity with the water in the reservoir 102, either directly or indirectly. The ozonated water circulating through the water ozonation loop 110 is then returned to the water reservoir for mixing and further sanitation at the distal end 122 of the water line 116.

To introduce ozone into the water cooler system an ozone feed loop 124 is used to draw air, ozone, or a mix thereof from the upper reservoir chamber 103 into the proximal end 126 of an ozone feed line 128 and to the distal end 130 of the line 128 through an ozone generator 132. The proximal end 126 of the line 128 may be optionally placed in receiving connection with the upper reservoir chamber 103 via a tee fitting in the air vent 104. This is a significant improvement because during a cleaning or ozonation cycle, when ozone is present in the water cooler system, the tee fitting prevents or reduces the escape of ozone to the external environment by diverting air away from the vent 104, thereby limiting the potential for human or animal exposure to ozone. If desired, the controller 136 discussed in detail below may be adapted to actuate a valve in the air vent 104 to seal off the water reservoir 102 from the external environment during an ozonation cycle.

While the placement and configuration of the proximal end 126 of the ozone feed line 128 in this embodiment as previously mentioned is preferred, in an analog to the description of the location of the proximal end 118 of the water line 116, the proximal end 126 may be appropriately coupled to the water reservoir at any upper surface of the water reservoir 102 suitable to allow the line 128 to pull the air/gas from the upper reservoir chamber 103 and into the loop 124. The configuration of the inlet to the ozone generator 132 in this manner permits ozone rich air that accumulates during an ozonation cycle to be recycled and circulated through the cleansing system regardless of the method used to introduce the ozone into the water. For example, in lieu of use of the venturi as more fully described below, the distal end 130 of the ozone feed line 128 may be connected to prior art systems for introducing ozone into the water cooler, such as impeller pumps and bubblers described above.

Before the distal end 130 of the ozone feed line 128 terminates at the venturi 114, it passes through an ozone generator 132 and an optional check valve 134 to prevent reverse flow or water entering into the ozone feed loop 124. The air, ozone or combination thereof that fills the upper reservoir chamber 103 passes through the ozone generator 132 when the ozone feed loop 124 is active, and the ozone generator 132 generates ozone thereby increasing the concentration of ozone in the line 128. As described in more detail below, the ozone generator may be bypassed during a portion of an ozonation cycle when ozone saturation levels are sufficient to complete the cycle without further ozone generation.

The distal end 130 of the ozone feed line 128 is connected to the venturi tube 114 at its restricted or low-pressure flow area. When water circulates from the water reservoir 102 through the venturi 114, an area of low pressure is created within the tube 114, creating suction at the distal end 130 of the ozone feed line 128. The low pressure force draws the gases from the upper reservoir chamber 103, through the ozone generator 132, and into the water circulating in the water loop 110 via the venturi 114, thereby imparting ozone into the water system.

The ozone feed loop 124 imparts the ozone to the circulating water in the water loop 110, which returns to the reservoir 102 where some ozone escapes from the now-ozonated water 101 to the upper reservoir chamber 103. Advantages of the present system include a more efficient ozonation system in which the flow of air and air/ozone mix through the system is created by the venturi tube effects instead of a pump or other similar device.

Further advantages can be demonstrated when considering the cumulative effects of the system on ozone levels. For example, the distal end 122 of the circulating water line 116 is connected to the top or near the top of the water reservoir 102. Ozonated water circulating in and exiting from loop 110 is dispelled into the reservoir 102. Some of the ozone imparted to the circulating water in the water loop 110 escapes into the upper reservoir chamber 103, while the rest of the ozone is carried by the water exiting the distal end 122 of the water line 116 into the volume of water 101 contained in the reservoir 102. While the circulating water pump 112 is activated, the ozonated water is again carried through the system, cleansing the surfaces with which it comes in contact.

With both the ozone generator 132 and circulating water pump 112 activated, a significant amount of residual ozone will accumulate in the upper reservoir chamber 103 in a relatively short time. At an interval selectable by those skilled in the art that will vary depending upon the exact application and water system characteristics, the ozone generator 132 may be deactivated, and the gases in the closed system will continue to circulate through the ozone feed loop 124. After a time, the ozone levels will have dissipated to negligible levels, the circulating water pump 112 may be deactivated, and the ozonation cycle is complete. Testing on some exemplary embodiments has shown that it may be beneficial for the water to continue to circulate for over 30 minutes beyond an ozone generation interval of only two minutes (i.e., deactivating the ozone generator 132 two minutes into the ozonation cycle and circulating water through the water loop 110 for approximately 30 additional minutes).

The present invention promotes longevity in ozone generator system elements in that for any given ozonation/cleansing cycle the recirculation of air in the cooler system results in a diminished need for ozone generation relative to comparable cycles of prior art systems. This in turn results in shorter run times for the generators during any given time period. Furthermore, the present invention reduces energy consumption over the life of the machine by maximizing the surface area contacted by ozonated water and reducing the length of time needed for ozone generation during ozonation cycles.

Turning back to FIG. 1, a controller 136 is shown communicatively coupled to the ozone generator 132 via 138 and to the circulating water pump 112 via 140. The controller can be embodied in any form known to those skilled in the art of water cooler design, such as by way of printed circuit board (PCB) utilizing hardware, firmware, software, or other similar methods. The controller 136 may optionally be connected to a user interface (not shown) so that users of the water coolers applying the teachings disclosed herein may input parameters to the controller 136 to customize, for instance, the length of an ozonation cycle, its periodic timing, and the ratio of the ozone generation interval to water circulation time.

In the exemplary embodiment of FIG. 1, the controller 136 activates and deactivates the ozone generator 132 and circulating water pump 112. To start a typical ozonation cycle, it is preferable that the controller 136 sends activation signals to actuate both the generator 132 and the pump 112. The controller times the elapsed run time during the ozonation cycle, and at a predetermined ozone generation interval selectable by a user, deactivates the ozone generator 132. At a second selectable interval, preferably equal to the cycle interval the controller 136 deactivates the circulating water pump 112, the timer is reset and the ozonation cycle is complete. The controller 136 may be used to initiate an ozonation cycle at periodic intervals, for instance every evening or early morning when a desire to use the water cooler will be unlikely.

Figure 2A:
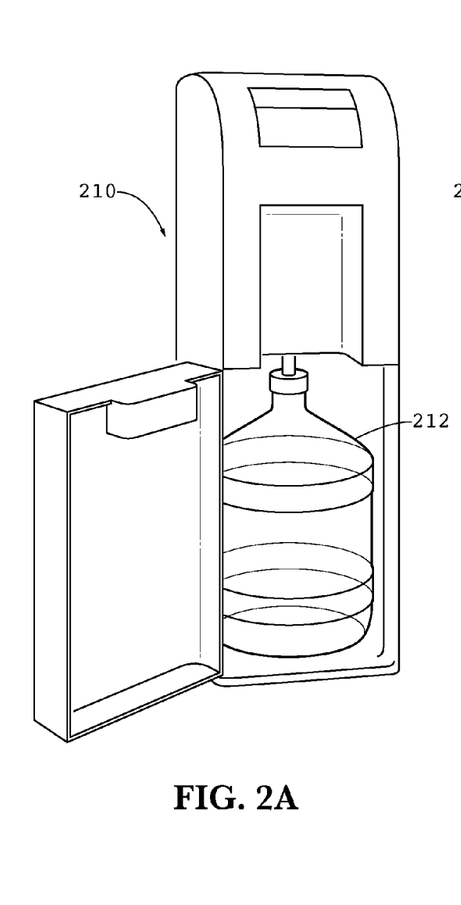
FIG. 2A illustrates a common configuration of a bottom-loaded cooler.
Figure 2B:
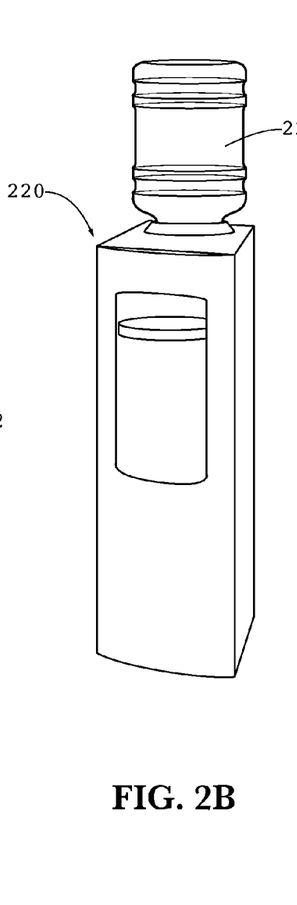
FIG. 2B illustrates a common configuration of a top-loaded cooler.
Figure 2C:
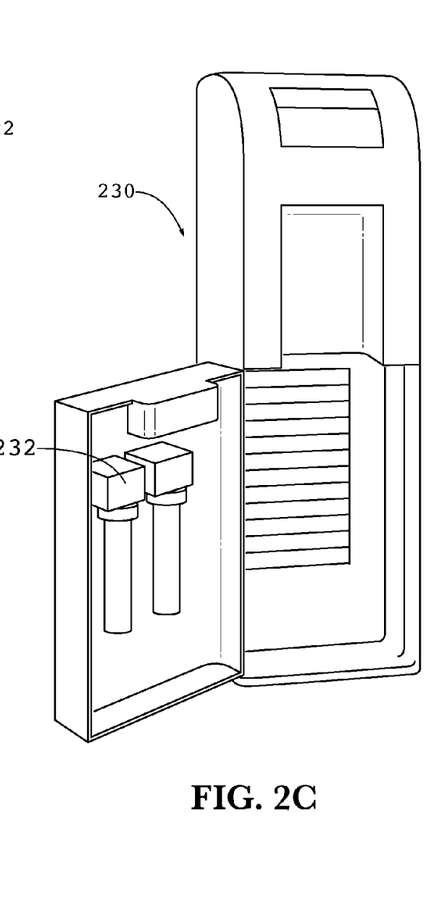
FIG. 2C illustrates a common configuration of a plumbed cooler (shown disconnected from the plumbing source)

The water coolers 210, 220 and 230 depicted in FIGS. 2A-C are examples of configurations that are common in the art. FIG. 2A, for example, is an example of a bottom load cooler configuration, in which the water source is a bottle or other similar container 212 located below the water reservoir. FIG. 2B is an example of a design configuration commonly referred to as a top load cooler, in which the water source is a bottle or other similar container 222 located above the water reservoir. Water dispensers that fall into the top load category as shown in FIG. 2B typically utilize gravity to transfer water from the water source to the water reservoir, whereas bottom load dispensers as in FIG. 2A typically pump the water from the water source to the water reservoir. Other common configurations of water coolers include the plumbed water cooler, as shown in FIG. 2C (plumbing source not shown). Plumbed water cooler units draw directly from a plumbing source to provide water to the water reservoir. The containers 212 and 222 and the plumbing source connections 232 are analogous to the water source 105 represented in FIG. 1.

Figure 3:
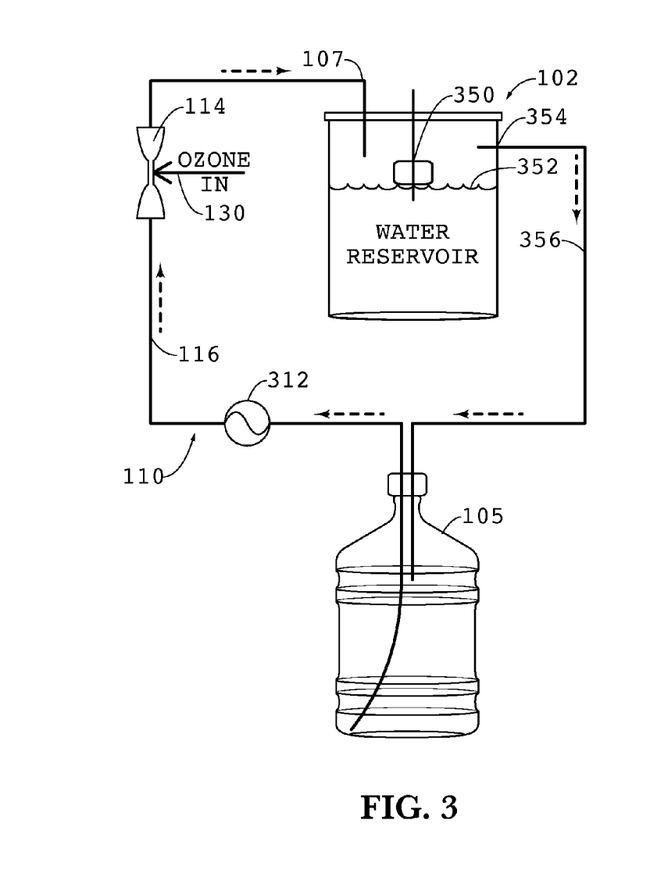
FIG. 3 is a schematic diagram view of a water ozonation loop of a second exemplary embodiment of the invention.

FIG. 3 is a schematic diagram view of a water ozonation loop of a second exemplary embodiment of the invention adapted for further improvement upon bottom load cooler configurations. The water source 105 in a bottom load cooler is situated below the water reservoir 102, and a water pump 312 is used to pull water through water line 116 and ultimately deliver it into the reservoir 102. A float 350 or other comparable sensor is used to monitor the water level 352 in the water reservoir. The float 350 has a low setting and a high setting that trigger the actuation and deactivation of the water pump 312, respectively.

Note that in the embodiment shown in connection with FIG. 1, the manner in which the water from the water source 105 is delivered to the water inlet connection 107 is not limited to any particular configuration. For example, the water source 105 could be a top load, bottom load or plumbed cooler configuration. However, in bottom load cooler scenarios, the embodiment disclosed in connection with FIG. 1 requires two water pumps (a circulating water pump and a water delivery pump) when the ozonation system is added to an existing design. Returning to the embodiment shown in FIG. 3, the ozonation system uses a water pump 312 to perform both functions.

This embodiment is also provided with an overflow fitting 354 and an overflow line 356 that provides an additional connection between the water reservoir 102 and the water source 105. The overflow fitting 354 is an outlet near the top of the water reservoir 102. It should be positioned in such a manner that when the water reservoir 102 is filled past the high setting on the float 350, the water will flow out of the water reservoir 102, through the overflow fitting 354 and overflow line 356, and return back to the water source 105. It is preferred in some embodiments that the overflow line 356 be constructed of ⅜ inch inner diameter tubing for fast drainage during an ozonation cycle.

For purposes of brevity, the details of the ozonation feed loop, controller and water outlet are not shown in FIG. 3. The distal end 130 of the ozonation feed line is shown coupled to the venturi 114. Those skilled in the art will appreciate that only the specifics of the embodiment and differences from the general system shown in FIG. 1 are illustrated for descriptive purposes.

The controller (not shown) may be adapted—as in FIG. 1—to coordinate an ozonation cycle for a cycle interval at preset times. During normal operation, the feedback from the float 350 is utilized to determine when to actuate the pump 312 and refill the water reservoir 102 with water from the water source 105. After the water reservoir 102 is refilled, the water pump 312 is deactivated.

During an ozonation cycle interval, the feedback from the float 350 is ignored. At the start of the cycle, the water pump 312 and ozone generator (not shown) are actuated to begin the ozonation process. Water from the water source 105 is pumped through the venturi 114 wherein ozone is imparted to the water, then through the water inlet connection 107 and into the water reservoir 102. The water level 352 in the water reservoir 102 will continue rising—preferably beyond the high setting of the float 350—until it reaches level with the overflow fitting 354, whereafter the water returns to the water source 105 through the overflow line 356. As previously described, the controller preferably deactivates the ozone generator after an ozone generation interval selected so that sufficiently high ozone concentration levels are reached within the system to adequately sanitize the interior surfaces of the waterways therein based upon the characteristics of the water system and the periodic cycling scheme of the ozonation system. The water pump 312 then preferably continues to circulate the water through the ozonation cycle, thereby sanitizing the lines, reservoir and water source 105.

Figure 4:
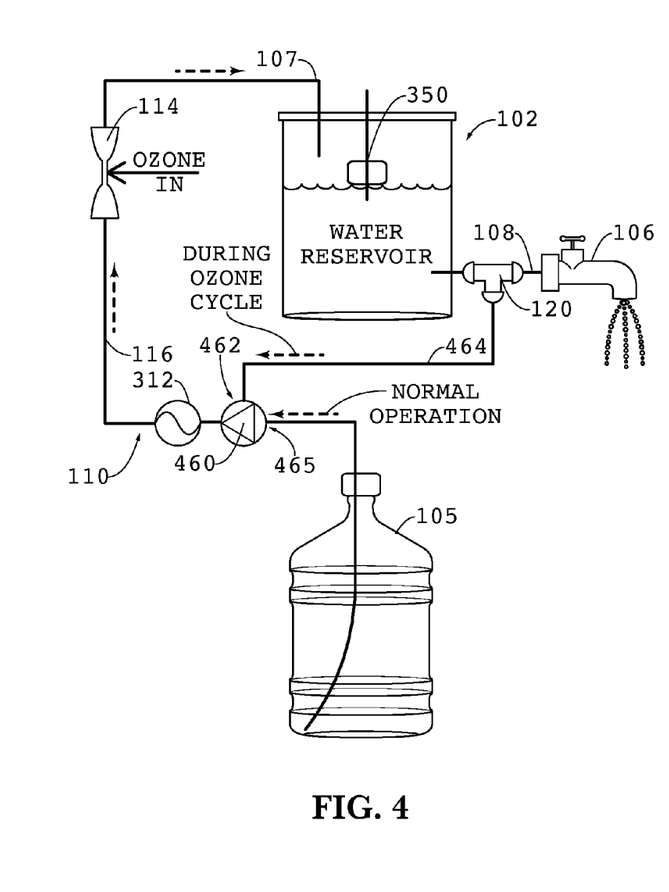
FIG. 4 is a schematic diagram view of a water ozonation loop of a third exemplary embodiment of the invention.

The advantages of utilizing an existing water delivery pump on a bottom load cooler (as shown in FIG. 3 and previously discussed) and the ability to ozonate the surfaces the water outlet surfaces (as shown in FIG. 1 and previously discussed) may be combined as shown in FIG. 4. FIG. 4 is a schematic diagram view of a water ozonation loop 110 of a third exemplary embodiment of the invention in which a water pump 312 of a bottom load cooler serves as both a water delivery pump as well as a circulating water pump, as in FIG. 3, but further includes an integral valve 460 joining the water ozonation loop 110 to the water outlet 108. The connection between a first inlet 462 of the valve 460 and the water outlet 108 can be, for instance, via the tee fitting 120 and a length of connecting piping 464, or alternatively by direct connection.

A second inlet 465 on the integral valve 460 is connected to the water source 105, and an outlet in the valve 460 leads to the water pump 312. As in FIG. 3, the bottom load cooler system is generally provided with a water reservoir 102 having a float 350 and water inlet connection 107. A circulating water line 116 leads from the valve 460 and through the water pump 312 and venturi 114 to return water to the water inlet connection 107 during an ozonation cycle or to replenish the water reservoir 102 with water from the water source 105. If desired, the venturi 114 may optionally be configured with a bypass for use during replenishment cycles.

The integral valve 460 has a first state and a second state, and selecting and switching between the appropriate state may be handled by the controller (not shown) adapted for such purposes. For example, it is preferred that the integral valve 460 be embodied as a three way solenoid valve wherein the controller actuates the solenoid to change between the states. Other comparable methods of controlling, operating, and constructing the valve will be evident to those skilled in art and are considered to be included as equivalents herein.

In the first state (i.e., normal bottom load cooler operation), the first inlet 462 is closed and the second inlet 465 is open, and operation of the water pump 312 transfers water from the water tank 105 to the water reservoir 102. In the second state, the first inlet 462 is open and the second inlet 465 is closed, and operation of the water pump 312 circulates water from the water reservoir 102 through the water outlet 108, through the venturi 114 wherein ozone is imparted to the circulating water (the ozone feed loop not shown for purposes of clarity and brevity), and back into the water reservoir 102. This embodiment has the advantage of allowing the maximum surface area of the internal waterways (e.g., up to the tee fitting 120 near the water tap 106), as well as energy savings resulting from the combined pumping functions performed by the water pump 312.

The controller (not shown in FIG. 4) is adapted for switching the integral valve to the second state from the first (default) state and actuating the circulating water pump and the ozone generator to implement an ozonation cycle. The ozonation cycle is completed after a selectable cycle interval. Preferably, the controller actuates the water pump for the entire cycle interval and the ozone generator during an ozone generation interval wherein the ozone generation interval is less than the cycle interval. Furthermore, it has been found to be preferable to select an ozone generation interval that is less than or equal to 10% of the cycle interval for optimum energy efficiency.

Figure 5:
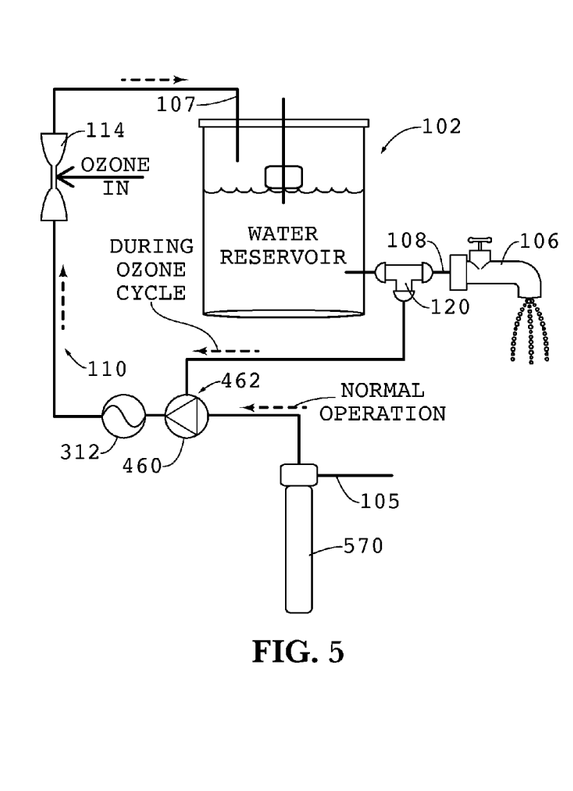
FIG. 5 is a schematic diagram view of a water ozonation loop of a fourth exemplary embodiment of the invention.

FIG. 5 is a schematic diagram view of a water ozonation loop of a fourth exemplary embodiment of the invention. This embodiment is identical to the embodiment shown in connection with FIG. 4, with the exception of the water source 105. Here, the water source 105 is a plumbed line that passes through an optional filtration system 570, for instance, which are commonly present in plumbed cooler system configurations. The water pump 312 in the water ozonation loop 110 circulates water from the water reservoir 102 through a water outlet 108, for example at a tee fitting 120 located near the water tap 106, through the first inlet 462 of the integral valve 460, the venturi 114 of the ozone feed loop (not shown) and into the water reservoir 102 through the water inlet connection 107.

Figure 6:
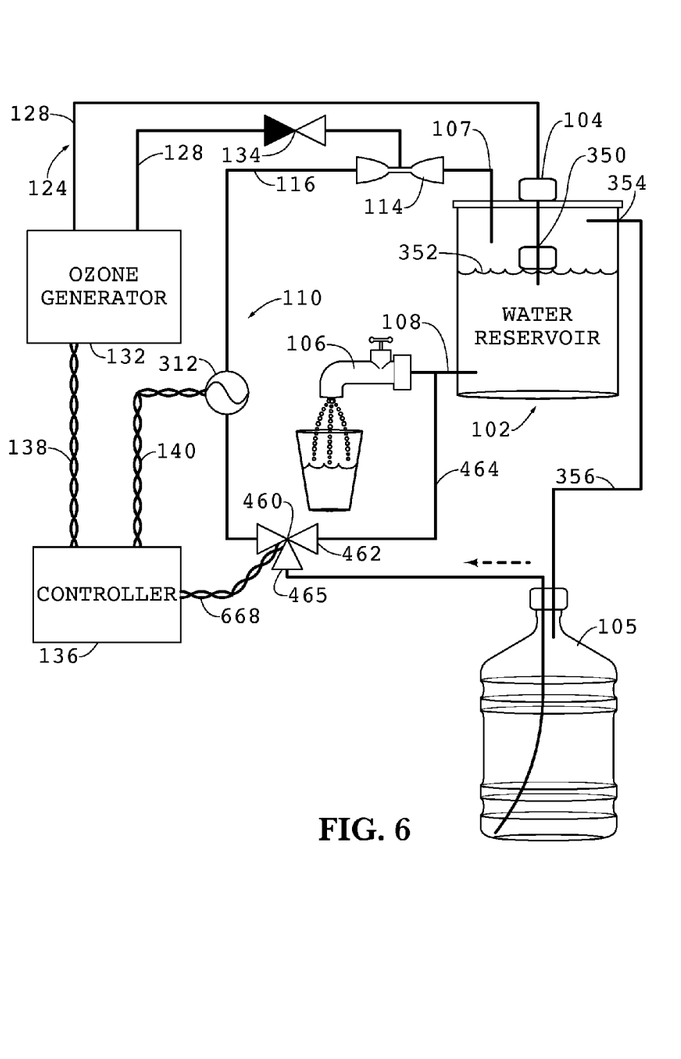
FIG. 6 is a schematic diagram view of a fifth exemplary embodiment of the invention.

Finally, FIG. 6 is a schematic diagram view of a fifth exemplary embodiment of the invention combining the features shown and described in connection with FIGS. 3 and 4 for a bottom load cooler configuration. In this embodiment, for instance, an integral valve 460, an overflow fitting 354 and overflow line 356 are present. The advantages of the embodiment are in part the energy savings arising from the use of a single water pump 312, as well as the ability to sanitize the largest amount of inner waterway surfaces for bottom load configurations. The controller 136 coordinates the actuation and monitoring of the ozone generator 132, the water pump 312, the integral valve 460, and the float 350 to enable at least three ozonation system states: a normal (default) state, a first ozonation state and a second ozonation state.

In the default state, the integral valve 460 is in the first state wherein the first inlet 462 is closed and the second inlet 465 is open. When the float 350 feedback indicates that the water level 352 in the water reservoir 102 equals the low setting, the controller actuates the water pump 312, deactivating it when the high setting on the float 350 is indicated.

In the first ozonation state, the circulating water line 116, water reservoir 102 and water outlet 108 are all sanitized, as well as any other inner waterway surfaces encountered by the circulating water in the water ozonation loop 110. To begin an ozonation cycle, the controller 136 switches the integral valve 460 to its second state, opening the first inlet 462 and closing the second inlet 465. The water pump 312 and ozone generator 132 are actuated, and water circulates in the water ozonation loop 110 and air/ozone circulates in the ozone feed loop 124 via an ozone feed line 128 as previously described herein. Preferably, after a selectable ozone generation interval during which ozone levels have risen due to ozone accumulation in the closed system, the controller 136 deactivates the ozone generator 132, and the water pump 312 continues to circulate water until a selectable cycle interval has been reached.

A second ozonation state is available in which the water source 105 is included in the water ozonation loop 110. The controller 136 ensures that the integral valve 460 is in its first state, with a closed first inlet 462 and an open second inlet 465. The feedback from the float 350 is ignored by the controller 136, and the circulating water pump 312 and ozone generator 132 are actuated. As described in connection with FIG. 3, the water reservoir 102 is filled with water transferred from the water source 105 until it begins to overflow through the overflow fitting 354—and overflow line 356 connected thereto—into the water source 105. The ozone feed loop 124 is imparting ozone into the water in the water ozonation loop 110 at the venturi 114, until the ozone generation interval is reached, at which time the controller 136 deactivates the ozone generator 132. The water pump 312 continues to circulate the ozonated water until the cycle interval is completed, and the ozone has been safely depleted during the sanitization process. Note that, during "overflow" (i.e., the second) ozonation of the water source 105 as described in this paragraph and in connection with FIG. 3, if the water level in the water source 105 (e.g., the bottle) is very low at the beginning of the an ozonation cycle so that the water source 105 is emptied during the cycle, then it is preferable that the ozone generator 132 is deactivated when the controller 136 detects an increase in power to the ozone generator 132.

In FIG. 6, note that optional communicative connections between the controller 136 and the float 350 and air vent 104 are not depicted like connections 138 (which connects the controller 136 to the ozone generator 132), 140 (which connects the controller 136 to the water pump 312) and 668 (which connects the controller 136 to the integral valve 460), but rather are implied for clarity. Communication links between the controller 136 and any of the actuatable elements described herein are not considered to be a limiting feature of the invention and may be accomplished by a variety of methods known to those skilled in the art, such as but not limited to: hard wire link, Bluetooth or WiFi wireless links, and other such protocols, methods, or combinations.

Furthermore, those skilled in the art may appreciate that the first and second ozonation states need not be mutually exclusive in the sense that they may both occur as part of a predetermined ozonation cycle. That is, an ozonation cycle may be coordinated in which one of the first and second ozonation states is entered at the beginning of the ozonation cycle, after which the controller switches to the second state to ozonate all waterways, and the ozone generation interval may be selected to fall in the first or second segment of the ozonation cycle. Alternatively, the first and second ozonation states could be utilized independently at periodic intervals, for example, the first state every other day during early morning hours, and the second state on days in between.

Any embodiment of the disclosed system and method may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A water sanitizing apparatus comprising:
a water source;
a water reservoir positioned above the water source and having a total volume and adapted for holding a volume of water comprising:
 a water inlet connection;
 an upper reservoir chamber containing air in a volume defined by the difference between the total volume of the water reservoir and the volume of water;
 an air vent;
 a water outlet connection coupling the water reservoir to a water outlet;
 and an overflow fitting;
an overflow line connecting the overflow fitting to the water source;
a water ozonation loop comprising:
 a circulating water line comprising:
  a proximal end coupled to the water source; and
  a distal end coupled to the water inlet connection;
 a circulating water pump; and
 a venturi tube,
 wherein the circulating water pump and the venturi tube are each disposed between the proximal end and the distal end of the circulating water line and are each connected to the circulating water line such that the flow of water through the circulating water line passes through each of the circulating water pump and the venturi tube; and
an ozone feed loop comprising;
 an ozone feed line comprising:
  a proximal end coupled to the air vent; and
  a distal end coupled to the venturi tube; and
 an ozone generator disposed between the proximal end and distal end of the ozone feed line and connected to the ozone feed line,
 wherein concurrent operation of the circulating water pump and the ozone generator circulates water through the water ozonation loop thereby drawing ozone from the ozone generator into the water ozonation loop.

2. The water sanitizing apparatus of claim 1, further comprising a controller adapted for actuating the circulating water pump and the ozone generator to implement an ozonation cycle for a cycle interval.

3. The water sanitizing apparatus of claim 2, wherein the controller is adapted to actuate the water pump during the cycle interval, and to actuate the ozone generator during an ozone generation interval wherein the ozone generation interval is less than the cycle interval.

4. The water sanitizing apparatus of claim 3, wherein the ozone generation interval is less than or equal to 10% of the cycle interval.

5. The water sanitizing apparatus of claim 1, further comprising a check valve positioned on the ozone feed loop to prevent water flow into the ozone generator.

6. An apparatus comprising
a water reservoir having a total volume and adapted for holding a volume of water comprising:
 a water inlet connection;
 an upper reservoir chamber containing air in a volume defined by the difference between the total volume of the water reservoir and the volume of water;
 an air vent; and
 a water outlet connection coupling the water reservoir to a water outlet;
an integral valve adapted for switching between a first state and a second state comprising:
 a first inlet connecting the integral valve with the water outlet, wherein the first inlet is closed in the first state and open in the second state;
 a second inlet connecting the integral valve with the water source, wherein the second inlet is open in the first state and closed in the second state; and
 an outlet open in both the first and second states;
a water ozonation loop comprising:
 a circulating water line comprising a proximal end coupled to the outlet of the integral valve and a distal end coupled to the water inlet connection;
 a circulating water pump; and
 a venturi tube,
 wherein the circulating water pump and the venturi tube are each disposed between the proximal end and the distal end of the circulating water line and are each connected to the circulating water line such that the flow of water through the circulating water line passes through each of the circulating water pump and the venturi tube; and
an ozone feed loop comprising;

an ozone feed line comprising a proximal end coupled to the air vent; and a distal end coupled to the venturi tube; and an ozone generator disposed between the proximal end and distal end of the ozone feed line and connected to the ozone feed line.

7. The water sanitizing apparatus of claim 6 wherein the water reservoir further comprises an overflow fitting, further comprising an overflow line connecting the overflow fitting to the water source.

8. The water sanitizing apparatus of claim 6, further comprising a controller adapted for switching the integral valve to the second state and actuating the circulating water pump and the ozone generator to implement an ozonation cycle for a cycle interval.

9. The water sanitizing apparatus of claim 8, wherein the controller is further adapted to actuate the water pump for the cycle interval, and to actuate the ozone generator during an ozone generation interval wherein the ozone generation interval is less than the cycle interval.

10. The water sanitizing apparatus of claim 9, wherein the ozone generation interval is less than or equal to 10% of the cycle interval.

\* \* \* \* \*